US012467339B2

(12) United States Patent
Altammar et al.

(10) Patent No.: US 12,467,339 B2
(45) Date of Patent: Nov. 11, 2025

(54) CARBON DIOXIDE MINERALIZATION AND STORAGE

(71) Applicant: SAUDI ARABIAN OIL COMPANY, Dhahran (SA)

(72) Inventors: Murtadha J. Altammar, Dhahran (SA); Rima Taqi Alfaraj, Dhahran (SA); Abeer Ateeq Alarawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/596,472

(22) Filed: Mar. 5, 2024

(65) Prior Publication Data
US 2025/0283391 A1    Sep. 11, 2025

(51) Int. Cl.
*E21B 41/00* (2006.01)
*C09K 8/594* (2006.01)

(52) U.S. Cl.
CPC .......... *E21B 41/0064* (2013.01); *C09K 8/594* (2013.01)

(58) Field of Classification Search
CPC ....... E21B 41/0064; B65G 5/00; B65G 5/005; C09K 8/594
USPC .......................................................... 166/50
See application file for complete search history.

(56) References Cited

U.S. PATENT DOCUMENTS 6,729,394 B1 * 5/2004 Hassan ................. E21B 43/305
166/268

2023/0038447 A1   2/2023  Hasan et al.
2023/0220752 A1   7/2023  Al-Qasim et al.

FOREIGN PATENT DOCUMENTS

| CN | 114541964 A | * | 5/2022 | |
|---|---|---|---|---|
| DE | 102004004689 A1 | * | 9/2005 | ............. B09B 1/008 |
| EP | 4101519 A1 | | 12/2022 | |
| WO | WO-2014089185 A1 | * | 6/2014 | ......... E21B 41/0064 |
| WO | WO-2022187290 A1 | * | 9/2022 | |
| WO | WO-2023073426 A1 | * | 5/2023 | ......... E21B 41/0064 |

OTHER PUBLICATIONS

Translation of DE-102004004689-A1 (Year: 2005).*
Translation of CN-114541964-A (Year: 2022).*
(Continued)

*Primary Examiner* — Angela M Ditrani Leff
(74) *Attorney, Agent, or Firm* — Vorys, Sater, Seymour and Pease LLP

(57) ABSTRACT

Methods of subterranean carbon dioxide storage may include: introducing, through an injection wellbore to a subterranean formation includes a basaltic formation, a carbonated aqueous fluid; reacting the carbon dioxide or an ion thereof with the basaltic formation to form mineralized carbon and a produced aqueous fluid; flowing a mixture of the carbonated aqueous fluid and/or the produced aqueous fluid through one or more formation fractures; depositing the mineralized carbon dioxide within the subterranean formation; and flowing the produced aqueous fluid from the subterranean formation through a first production wellbore, wherein a portion of the first production wellbore is substantially parallel to a portion of the injection wellbore, and wherein the one or more formation fractures are substantially perpendicular to a portion of the injection wellbore and a portion of the first production wellbore.

19 Claims, 1 Drawing Sheet

(56) References Cited

OTHER PUBLICATIONS

Muhammad Ali, et al., Enhancing the CO2 trapping capacity of Saudi Arabian basalt via nanofluid treatment: Implications for CO2 geo-storage, Chemosphere, vol. 335, 2023, 139135, ISSN 0045-6535, https://doi.org/10.1016/j.chemosphere.2023.139135.

Muhammad Ali, et al. Saudi Arabian basalt/CO2/brine wettability: Implications for CO2 geo-storage, Journal of Energy Storage, vol. 62, 2023, 106921, ISSN 2352-152X, https://doi.org/10.1016/j.est.2023.106921.

Eric H. Oelkers, et al., The subsurface carbonation potential of basaltic rocks from the Jizan region of Southwest Saudi Arabia, International Journal of Greenhouse Gas Control, vol. 120, 2022, 103772, ISSN 1750-5836.

Ricks, W., Norbeck, et al. The value of in-reservoir energy storage for flexible dispatch of geothermal power. Applied Energy, 313, (2022) p. 118807.

Mark McClure, ResFrac, Fervo Energy's 'Project Red' Results are a Historic Breakthrough for Geothermal Energy—What Comes Next ?; Jul. 19, 2023; retrieved from https://www.resfrac.com/blog/fervo-energys-project-red-results-are-a-historic-breakthrough-for-geothermal-energy-what-comes-next.

Ludmila Adam, et al., CO2 Sequestration in Basalt: Carbonate Mineralization and Fluid Substitution; Paper presented at the 2011 SEG Annual Meeting, San Antonio, Texas, Sep. 2011.Paper No. SEG-2011-2108 Published: Sep. 18, 2011.

PCT International Search Report & Written Opinion pertaining to International Application No. PCT/US2025/015623; Date of Mailing: May 7, 2025.

Snæbjörnsdóttir, S.Ó., et al. Carbon dioxide storage through mineral carbonation. Nat Rev Earth Environ 1, 90-102 (2020).

\* cited by examiner

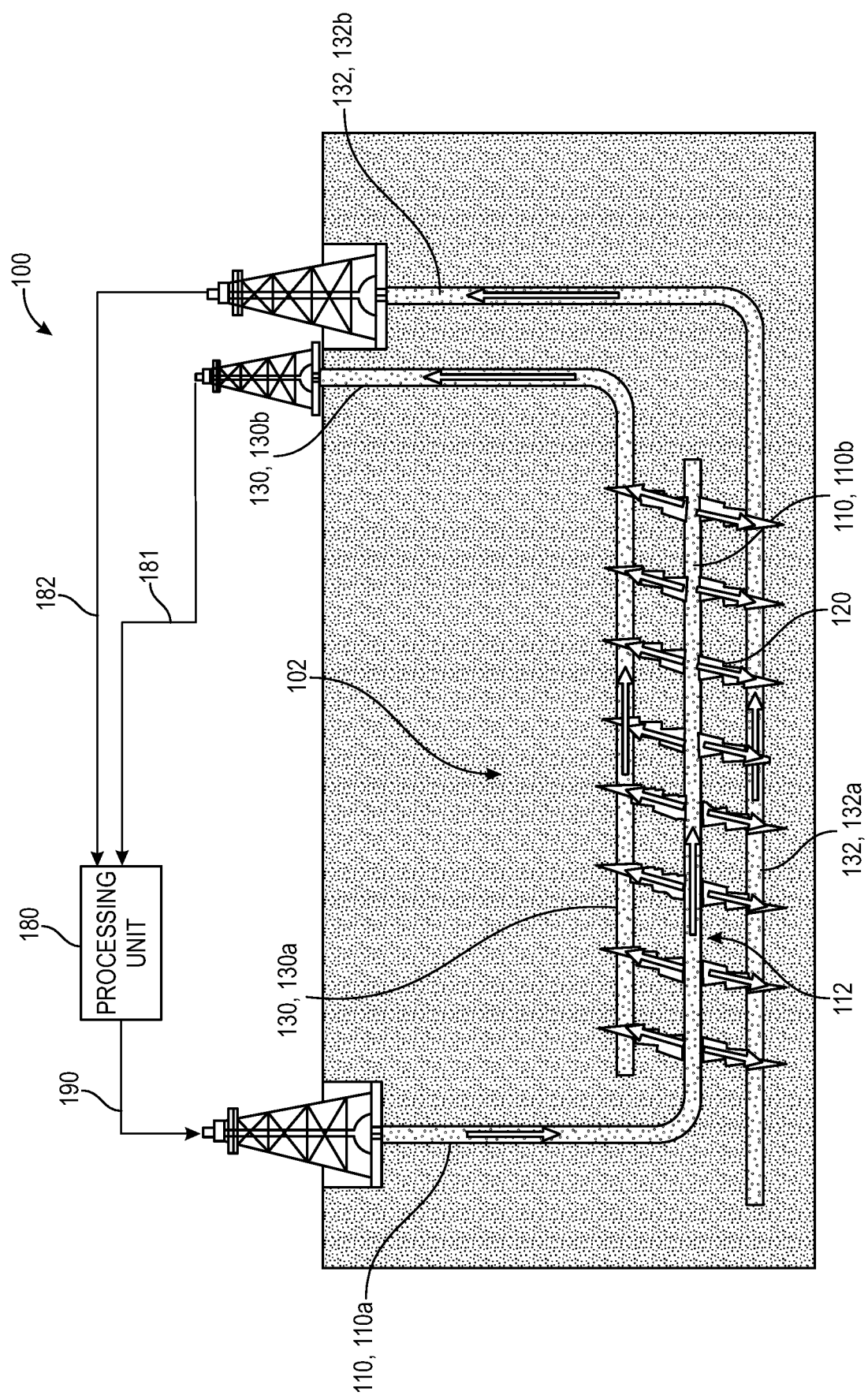

CARBON DIOXIDE MINERALIZATION AND STORAGE

FIELD OF THE DISCLOSURE

The present disclosure relates generally to carbon dioxide sequestration and, more particularly, to mineralization and storage of carbon dioxide.

BACKGROUND OF THE DISCLOSURE

Reducing greenhouse gas emissions such as those of carbon dioxide are included in many energy transition plans. In particular, carbon capture, utilization, and storage (CCUS) is believed to be a promising technology area for reducing greenhouse gas emissions. As global populations continue to rise, use of fossil-fuels will continue for purposes including heating and cooling, power generation, transport, and industry. CCUS offers emission reduction technology that may be applied across the energy system. CCUS technologies allow for the capture of carbon dioxide ($CO_2$) from fuel combustion or other industrial processes, transportation of the $CO_2$, and use of the $CO_2$, either through a storage means (e.g., in subterranean geological formations) or as a resource to create products or services (e.g., for industrial uses).

Carbon dioxide mineralization is a form of CCUS whereby $CO_2$ is chemically converted to a mineral, often a carbonate compound. Mineralization of $CO_2$ allows for stable storage and/or processing of carbonate product for industrial use.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting example method of the present disclosure may include: introducing, through an injection wellbore to a subterranean formation, a carbonated aqueous fluid comprising carbon dioxide dispersed within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and/or the produced aqueous fluid through one or more formation fractures; depositing the mineralized carbon dioxide within the subterranean formation; and flowing the produced aqueous fluid from the subterranean formation through one or more production wellbores, wherein the one or more production wellbores comprises a first production wellbore, wherein a portion of the first production wellbore is substantially parallel to a portion of the injection wellbore, and wherein the one or more formation fractures are substantially perpendicular to a portion of the injection wellbore and a portion of the first production wellbore.

A second nonlimiting example method of the present disclosure may include: introducing, through an injection wellbore to a subterranean formation, a carbonated aqueous fluid comprising carbon dioxide at least partially dissolved within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and/or the produced aqueous fluid through one or more formation fractures, wherein the flowing occurs for a residence time; maintaining, for the duration of the residence time, the mixture within the subterranean formation; depositing the mineralized carbon dioxide within the subterranean formation; flowing the produced aqueous fluid from the subterranean formation through one or more production wellbores, wherein the one or more production wellbores comprises a first production wellbore, wherein a portion of the first production wellbore is substantially parallel to a portion of the injection wellbore, and wherein the one or more formation fractures are substantially perpendicular to a portion of the injection wellbore and a portion of the first production wellbore; carbonating the produced aqueous fluid such that the produced aqueous fluid is converted recycled carbonated aqueous fluid; and introducing the recycled carbonated aqueous fluid to the subterranean formation along with the carbonated aqueous fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The FIGURE is a diagram of a nonlimiting example system according to the present disclosure.

DETAILED DESCRIPTION

Embodiments of the present disclosure will now be described in detail with reference to the accompanying Figure(s). Like elements in the various figure(s) may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figure(s) may vary without departing from the scope of the present disclosure.

Embodiments in accordance with the present disclosure generally relate to carbon dioxide sequestration and, more particularly, to mineralization and storage of carbon dioxide.

The present disclosure provides methods and systems for carbon dioxide sequestration through mineralization and dissolution of carbon dioxide through use of aqueous solutions. The present disclosure may allow for mineralization of carbon dioxide in a stable manner that reduces overall greenhouse gas emissions. Furthermore, the present disclosure may allow for mineralization with reduced water used as compared to conventional methods.

"Carbon dioxide," "carbon dioxide gas," and grammatical variations thereof as used herein may refer to carbon dioxide in gaseous, aqueous, or like forms, or any combination thereof.

The present disclosure may utilize carbonated aqueous fluid having carbon dioxide dissolved or otherwise dispersed therein.

Carbonated aqueous fluid may subsequently be introduced to a subterranean formation, preferably a subterranean formation comprising basaltic rock therein for mineralization of the carbon dioxide. Following mineralization, carbonated aqueous fluid may become produced aqueous fluid. Subsequently produced aqueous fluid may be carbonated and recycled for mineralization in a subterranean formation (e.g., within the subterranean formation from which the produced aqueous fluid originated, a different subterranean formation from which the produced aqueous fluid originated, or any combination thereof).

Suitable formations for use in mineralization of carbon dioxide according to the present disclosure may include formations having minerals therein capable of reacting with carbon dioxide or ions thereof and converting said carbon dioxide to mineralized carbon dioxide. Examples of suitable formations may include, but are not limited to, basaltic formations, mafic formations, ultramafic formations, the like, or any combination thereof. Suitable formations may include minerals of elements including, but not limited to, calcium (Ca), magnesium (Mg), iron (Fc), the like, or any combination thereof. Example minerals of interest for reaction to form mineralized carbon dioxide according to the present disclosure may include, but are not limited to, for example, fosterite ($Mg_2SiO_4$), plagioclase ($CaAl_2Si_2O_8$), the like, or any combination thereof.

Carbonated aqueous fluids as used in the present disclosure may comprise any suitable aqueous fluid including, but not limited to, for example, brine, seawater, waste water, brine from desalination, produced water, formation water, the like, or any combination thereof. Aqueous fluids included in the carbonated aqueous fluid may have any suitable total dissolved solids content (TDS), including a TDS of 100 ppm to 250,000 ppm (or 100 ppm to 100,000 ppm, or 1,000 ppm to 250,000 ppm), prior to addition of carbon dioxide. Carbonated aqueous fluids of the present disclosure may further include one or more additional additives for achieving one or more desired functions in addition to mineralization of carbon dioxide. Examples of suitable additional additives may include, but are not limited to, a salt, an inert solid, a fluid loss control agent, an emulsifier, a dispersion aid, a corrosion inhibitor, an emulsion thinner, an emulsion thickener, a viscosifying agent, a gelling agent, a surfactant, a particulate, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a control agent, the like, or any combination thereof. Additional additives may be included in carbonated aqueous fluids of the present disclosure for reducing or otherwise mitigating blockage of channels within the subterranean formation; such additives for mitigating blockage may include, but are not limited to, an acidizing agent, a surfactant, a kinetic inhibitor, the like, or any combination thereof. Suitable examples of the foregoing discussed additional additives will be familiar to one having ordinary skill in the art.

Carbon dioxide may have been previously introduced to carbonated aqueous fluid at any suitable pressure, temperature, and flowrate as well as in any suitable amount. Carbon dioxide may be present in the carbonated aqueous fluid at any suitable concentration. Carbon dioxide may be present in the carbonated aqueous fluid at a quantity at or greater than the saturation limit of carbon dioxide gas in the aqueous fluid, such that the carbonated aqueous fluid is oversaturated. "Saturation limit," "saturated," and grammatical variations thereof, as used herein refers to wherein a solution has absorbed a maximum amount of a solute at given temperature and pressure conditions. "Oversaturated" as used herein refers to a solution that contains more solute than the maximum saturated amount, wherein the additional solute beyond the maximum saturated amount cannot be absorbed in the solution at given temperature and pressure conditions. As a nonlimiting example carbon dioxide may be present in the carbonated aqueous fluid at a quantity that is from about 0.01 mol % to about 25 mol % (or about 0.1 mol % to about 15 mol %, or about 5 mol % to about 15 mol %).

Within carbonated aqueous fluid, carbon dioxide ($CO_2$) may undergo a disassociation reaction. Without being bound by theory, nonlimiting example reactions depicting disassociation of $CO_2$ in aqueous fluid are shown in Equations 1 and 2 below.

$$CO_2(aq)+H_2O(aq) \leftrightarrow H_2CO_3(aq) \quad (1)$$

$$H_2CO_3(aq) \leftrightarrow HCO_3^-(aq)+H^+(aq) \quad (2)$$

Carbonated aqueous fluid may be introduced to the subterranean formation in any suitable fashion, including injecting carbon dioxide into an aqueous fluid within the subterranean formation, injecting a previously carbonated aqueous fluid to the subterranean formation, or any combination thereof. Carbonated aqueous fluid may be introduced at any suitable pressure. Carbonated aqueous fluid may be added to the subterranean formation at any suitable flow rate. The flow rate may be determined by features of the subterranean formation (e.g., geology, pore volume, wellbore depth, the like, or any combination thereof). Carbonated aqueous fluid may be added into the subterranean formation in any quantity including a quantity greater than the stoichiometric quantity needed to completely react with minerals of the subterranean formation. Such greater than stoichiometrically needed quantity may allow for ensuring sufficient reaction of the carbon dioxide and minerals of the subterranean formation to form mineralized carbon dioxide. As a nonlimiting example, the quantity of carbon dioxide introduced to the subterranean formation may preferably be from about 5% to about 25% (or about 10% to about 20%) pore volume of the subterranean formation.

Minerals of the subterranean formation may form ions due to interaction with carbonated aqueous fluid and/or ions therein. Without being bound by theory, minerals of the subterranean formation may generally form mineral-element ions ($M^{2+}$) within the subterranean formation according to Equation 3

$$M_aX+bH^+ \rightarrow aM^{2+}+cH_2O+[byproducts] \quad (3)$$

where X represents a suitable moiety of a suitable mineral compound including M, where a, b, and c are constants, where M represents any suitable mineral-element of the subterranean formation. Suitable mineral-elements for interaction with carbon dioxide may include, but are not limited to, for example, calcium (Ca), magnesium (Mg), iron (Fe), the like, or any combination thereof. Byproducts of Equation 3 may include various mineral compounds (e.g., oxides, the like). Specific nonlimiting examples of Equation 3 are shown below in Equation 3A and 3B.

$$Mg_2SiO_4(s)+4H^+(aq) \rightarrow 2Mg^{2+}(aq)+H_2O(aq)+SiO_2(aq) \quad (3A)$$

$$CaAl_2Si_2O_8(s)+8H^+(aq) \rightarrow Ca^{2+}(aq)+2Al^{3+}(aq)+4H_2O(aq)+2SiO_2(aq) \quad (3B)$$

The carbonated aqueous fluid may contact minerals of the subterranean formation, subsequently converting carbon dioxide ($CO_2$) to mineralized carbon dioxide ($MCO_3$) through interaction with mineral-element ions ($M^{2+}$) formed within the subterranean formation. Without being bound by theory, nonlimiting example reactions are shown in Equations 4 and 5 below.

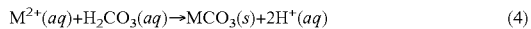

$$M^{2+}(aq) + H_2CO_3(aq) \rightarrow MCO_3(s) + 2H^+(aq) \qquad (4)$$

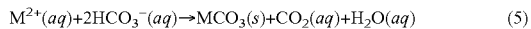

$$M^{2+}(aq) + 2HCO_3^-(aq) \rightarrow MCO_3(s) + CO_2(aq) + H_2O(aq) \qquad (5)$$

where M represents any suitable mineral-element of the subterranean formation. Mineralized carbon dioxide ($MCO_3$) may precipitate out of solution and be deposited within the subterranean formation for long term storage as shown above. Mineralized carbon dioxide may include any suitable compounds such as, for example, a carbonate compound, a bicarbonate compound, the like, or any combination thereof. Carbonated compounds of interest in the present disclosure may include, but are not limited to, for example, calcium carbonate ($CaCO_3$), magnesium carbonate ($MgCO_3$), ferrous carbonate ($FeCO_3$), the like, or any combination thereof.

The mineralizing of carbon dioxide may occur at any temperature including temperatures of the subterranean formation. Preferred temperatures for mineralizing carbon dioxide may include a temperature of about 5° C. to about 300° C., or about 30° C. to about 300° C., or about 10° C. to about 200° C., or about 25° C. to about 100° C., or about 25° C. to about 125° C. Mineralizing of carbon dioxide may occur at any pressure including pressures of the subterranean formation. Preferred pressures for mineralizing carbon dioxide may include a pressure of about 0.3 MPa to about 35 MPa, or about 0.3 MPa to about 14 MPa, or about 0.3 MPa to about 11 MPa. Such pressure may be maintained, for example, by the introduction of the carbonated aqueous fluid to the subterranean formation and apparatus therefor. Mineralizing of carbon dioxide may occur for a shut-in time, during which carbonated aqueous fluid is maintained within the subterranean formation, allowed carbon dioxide to interact with minerals of the subterranean formation so as to form mineralized carbon dioxide. Such a shut-in time may be from about 1 hour to about 4 years, or about 1 hour to about 3 years, or about 1 hour to about 2 years, or about 1 hour to about 1 year, or about 1 hour to about 180 days, or about 30 days to about 2 years, or about 30 days to about 1 year, or about 180 days to about 4 years, or about 2 years to about 4 years, or about 2 years to about 3 years. It should be noted that in some embodiments, methods and systems of the present disclosure may operate, at least a portion of the time, in a continuous fashion in which carbonated aqueous fluid is continuously introduced to a subterranean formation and/or produced aqueous fluid is continuously removed from the subterranean formation. In such continuous operation, shut-in time may correspond to residence time of carbonated aqueous fluid within the subterranean formation. "Residence time," as used herein refers to a time during which a quantity of carbonated aqueous fluid is exposed to minerals within the subterranean formation for reaction to form mineralized carbon dioxide.

It should be noted that the present disclosure may include systems and methods for mineralizing carbon dioxide as described. Such methods may include introducing carbonated aqueous fluid to a subterranean formation through one or more injection wellbores (e.g., a first injection wellbore), reacting the carbon dioxide or an ion thereof with the subterranean formation to form mineralized carbon dioxide, depositing the mineralized carbon dioxide within the subterranean formation, including within a delivery zone of the subterranean formation, thereby forming a produced aqueous fluid from the carbonated aqueous fluid, flowing the carbonated aqueous fluid and/or the produced aqueous fluid through one or more formation fractures, and flowing the produced aqueous fluid from the subterranean formation through one or more production wellbores. The one or more injection wellbores may comprise one or more, or two or more, or three or more, or four or more injection wellbores.

The one or more production wellbores may comprise one or more, or two or more, or three or more, or four or more production wellbores. The one or more production wellbores may include a first production wellbore. The one or more production wellbores may include a second production wellbore. The first production wellbore may include a portion that is substantially parallel to the injection wellbore. The first production wellbore may include a portion that is substantially parallel to the second production wellbore. The one or more formation fractures may include portions that are substantially perpendicular to the injection wellbore and/or the one or more production wellbores (e.g., the first production wellbore, the second production wellbore.)

"Substantially parallel" and grammatical variations thereof as used herein refers to wellbores and/or tubing with a central axis deviating from a parallel axis of another wellbore/tubing by about 45 degrees or less, or about 30 degrees or less, or about 20 degrees or less, or about 10 degrees or less, or about 5 degrees or less, or about 0 degrees, about 0 degrees to about 45 degrees, or about 0 degrees to about 20 degrees, or about 0 degrees to about 5 degrees.

"Substantially perpendicular" and grammatical variations thereof as used herein refers to wellbores and/or tubing with a central axis deviating from a perpendicular (e.g., right angle) axis of another wellbore/tubing by about 45 degrees or less, or about 30 degrees or less, or about 20 degrees or less, or about 10 degrees or less, or about 5 degrees or less, or about 0 degrees, about 0 degrees to about 45 degrees, or about 0 degrees to about 20 degrees, or about 0 degrees to about 5 degrees.

Methods and systems of the present disclosure may further include recycling of produced aqueous fluid for mineralization in a subterranean formation. Such produced aqueous fluid may be carbonated according to the present disclosure and subsequently may be introduced to a subterranean formation for mineralization therein as recycled carbonated aqueous fluid. Such recycling may occur within the subterranean formation from which the produced aqueous fluid originated, a different subterranean formation from which the produced aqueous fluid originated, or any combination thereof.

In some embodiments, the fluids (e.g., carbonated aqueous fluid) disclosed herein (including mixing of individual components or mixtures thereof) may be mixed at a remote location from a job site and shipped thereto or, in other embodiments, the fluids may be mixed at a job site. In still other embodiments, the fluids may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is the most appropriate for a given operation. The systems used for handling fluids for use in operations of the present disclosure may include one or more mixing and/or storage tanks used for mixing and/or storing, respectively, fluids prior to use in a carbon dioxide mineralization operation. Additional tanks may be used for storing fluids removed from a subterranean formation as part of the operation. Following a carbon dioxide mineralization operation, the fluids or a spent or partially spent variant thereof may be produced from the subterranean formation during fluid flowback as outflow solution.

Systems for introduction of fluids (e.g., carbonated aqueous fluid) to a wellbore in conjunction with a carbon dioxide mineralization operation may comprise a pump fluidly coupled to a tubing, the tubing located at least partially within the wellbore and the tubing containing a fluid for a desired operation. The "pump" described herein may comprise a single pump or may comprise one or more pumps in any combination. Given the benefit of the present disclosure, one having ordinary skill in the art will be able to select an appropriate pump or combination of pumps for a given operation.

The fluids of the present disclosure may be introduced (e.g., injected, pumped) through an injection wellbore to a subterranean formation using an injection wellbore tubing located within the injection wellbore. The fluid used in a particular operation may flow downhole through the wellbore tubing and flow out of the tubing into the subterranean formation for mineralization of carbon dioxide therein. Such wellbore tubing of an injection wellbore may have portions that may be substantially horizontal, substantially vertical, or any combination thereof. "Substantially horizontal" or "substantially vertical," and grammatical variations thereof as used herein refers to a wellbore and/or tubing primarily in the horizontal or vertical plane, respectively, with a central axis of the wellbore tubing deviating from the respective plane by about 45 degrees or less, or about 30 degrees or less, or about 20 degrees or less, or about 10 degrees or less, or about 5 degrees or less, or about 0 degrees, about 0 degrees to about 45 degrees, or about 0 degrees to about 20 degrees, or about 0 degrees to about 5 degrees. Such fluids may flow through formation fractures. Subsequently, fluids may be flowed back to the wellhead along with residual components as produced aqueous fluid. The produced aqueous fluid may flow through a production wellbore tubing or wellbore annulus. The use of such produced aqueous fluid may be for any suitable purpose including, but not limited to, for example, recycling fluids or to relieve pressure of the subterranean formation.

A nonlimiting example system 100 for introduction of fluids according to the present disclosure is shown in the FIGURE. System 100 may include an injection wellbore 110 for introduction of fluids to a subterranean formation 102, injection wellbore 110 including an upper portion 110*a* and a lower portion 110*b*. System 100 may further include a delivery zone 112, in which lower portion 110*b* of injection wellbore 110 may deliver fluids for mineralization within the subterranean formation 102. Upon delivery, fluids may flow through one or more formation fractures 120 toward one or more production wellbores, including a first production wellbore 130, the first production wellbore 130 having a lower portion 130*a* and an upper portion 130*b*, and the lower portion 130*a* located in delivery zone 112. Optionally, system 100 may include a second production wellbore 132, the second production wellbore 132 having a lower portion 132*a* and an upper portion 132*b*, and the lower portion 132*a* located in delivery zone 112. Fluids may be removed from the delivery zone 112 through the one or more production wellbores 130, 132.

As depicted in the FIGURE, lower portion 110*b* of injection wellbore 110 as well as lower portions 130*a* (and 132*a*, if included) of production wellbore 130 (and production wellbore 132, if included) may be substantially parallel to each other, as described previously. Furthermore, the one or more formation fractures 120 may be substantially perpendicular to lower portion 110*b* of injection wellbore 110 and/or lower portion 130*a* (and 132*a*, if included) of production wellbore 130 (and production wellbore 132, if included).

Furthermore, fluids removed through production wellbores 130 (and 132, if included) may be conveyed by one or more recycle lines (e.g., recycle line 181, and, optionally, recycle line 182) to processing unit 180. Processing unit 180 may carbonate produced fluids (e.g., produced aqueous fluid) and may supply fluids (e.g., recycled carbonated aqueous fluid, produced aqueous fluid, the like, or any combination thereof) to injection wellbore 110 via a line 190.

It should be noted that although the FIGURE depicts one (1) injection wellbore 110 and two (2) production wellbores 130 and 132, various numbers of injection and production wellbores may be used in accordance with the present disclosure.

It should be noted that additional nonlimiting components may be present in systems suitable to introduce the fluids (e.g., carbonated aqueous fluid) of the present disclosure to a subterranean formation and/or to recover fluid from the subterranean formation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

Additional Embodiments

Embodiments disclosed herein include:

Embodiment 1. A method comprising: introducing, through an injection wellbore to a subterranean formation, a carbonated aqueous fluid comprising carbon dioxide dispersed within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and/or the produced aqueous fluid through one or more formation fractures; depositing the mineralized carbon dioxide within the subterranean formation; and flowing the produced aqueous fluid from the subterranean formation through one or more production wellbores, wherein the one or more production wellbores comprises a first production wellbore, wherein a portion of the first production wellbore is substantially parallel to a portion of the injection wellbore, and wherein the one or more formation fractures are substantially perpendicular to a portion of the injection wellbore and a portion of the first production wellbore.

Embodiment 2. The method of Embodiment 1, further comprising: flowing the produced aqueous fluid from the subterranean formation through a second production wellbore, wherein a portion of the second production wellbore is substantially parallel to the injection wellbore and the first production wellbore, and wherein the one or more formation fractures are substantially perpendicular to a portion of the second production wellbore.

Embodiment 3. The method of Embodiments 1 or 2, further comprising: carbonating the produced aqueous fluid such that the produced aqueous fluid is converted recycled carbonated aqueous fluid; and introducing the recycled carbonated aqueous fluid to the subterranean formation along with the carbonated aqueous fluid.

Embodiment 4. The method of any one of Embodiments 1-3, wherein the basaltic formation comprises a mineral of at least one of: calcium, magnesium, or iron.

Embodiment 5. The method of any one of Embodiments 1-4, further comprising: maintaining, for a shut-in time, the mixture within the subterranean formation during the reacting of the carbon dioxide or the ion thereof with the basaltic formation.

Embodiment 6. The method of Embodiment 5, wherein the shut-in time is from about 1 hour to about 90 days.

Embodiment 7. The method of any one of Embodiments 5-6, wherein the introducing of the carbonated aqueous fluid occurs in a continuous fashion and wherein the shut-in time comprises a residence time.

Embodiment 8. The method of any one of Embodiments 1-7, wherein the carbon dioxide is at least partially dissolved within the aqueous fluid.

Embodiment 9. The method of any one of Embodiments 1-8, wherein the carbonated aqueous fluid has total dissolved solids of about 100 parts per million (ppm) to about 250,000 ppm.

Embodiment 10. The method of any one of Embodiments 1-9, wherein a quantity of the carbon dioxide introduced to the subterranean formation is in excess of a stoichiometric quantity needed to completely react with the basaltic formation to form the mineralized carbon dioxide.

Embodiment 11. The method of any one of Embodiments 1-10, wherein the mineralized carbon dioxide comprises a carbonate compound.

Embodiment 12. The method of Embodiment 11, wherein the carbonate compound comprises calcium carbonate, magnesium carbonate, ferrous carbonate, or any combination thereof.

Embodiment 13. The method of any one of Embodiments 1-12, wherein the reacting occurs at a pressure of about 0.3 MPa to about 11 MPa.

Embodiment 14. A method comprising: introducing, through an injection wellbore to a subterranean formation, a carbonated aqueous fluid comprising carbon dioxide at least partially dissolved within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and/or the produced aqueous fluid through one or more formation fractures, wherein the flowing occurs for a residence time; maintaining, for the duration of the residence time, the mixture within the subterranean formation; depositing the mineralized carbon dioxide within the subterranean formation; flowing the produced aqueous fluid from the subterranean formation through one or more production wellbores, wherein the one or more production wellbores comprises a first production wellbore, wherein a portion of the first production wellbore is substantially parallel to a portion of the injection wellbore, and wherein the one or more formation fractures are substantially perpendicular to a portion of the injection wellbore and a portion of the first production wellbore; carbonating the produced aqueous fluid such that the produced aqueous fluid is converted recycled carbonated aqueous fluid; and introducing the recycled carbonated aqueous fluid to the subterranean formation along with the carbonated aqueous fluid.

Embodiment 15. The method of Embodiment 14, wherein the basaltic formation comprises a mineral of at least one of: calcium, magnesium, or iron.

Embodiment 16. The method of Embodiments 14 or 15, wherein the residence time is from about 1 hour to about 90 days.

Embodiment 17. The method of any one of Embodiments 14-16, wherein the carbonated aqueous fluid has total dissolved solids of about 100 parts per million (ppm) to about 250,000 ppm.

Embodiment 18. The method of any one of Embodiments 14-17, wherein a quantity of the carbon dioxide introduced to the subterranean formation is in excess of a stoichiometric quantity needed to completely react with the basaltic formation to form the mineralized carbon dioxide.

Embodiment 19. The method of any one of Embodiments 14-18, wherein the mineralized carbon dioxide comprises a carbonate compound.

Embodiment 20. The method of Embodiment 19, wherein the carbonate compound comprises calcium carbonate, magnesium carbonate, ferrous carbonate, or any combination thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
introducing a carbonated aqueous fluid comprising carbon dioxide dispersed within an aqueous fluid into a subterranean formation, through a portion of an injection wellbore, wherein the portion of the injection wellbore is a substantially horizontal portion thereof located in a delivery zone of the subterranean formation, and wherein the subterranean formation comprises a mineral of at least one of: calcium, magnesium, or iron;
reacting the carbon dioxide or an ion thereof with the subterranean formation to form mineralized carbon and a produced aqueous fluid;
flowing a mixture of the carbonated aqueous fluid and/or the produced aqueous fluid through a plurality of formation fractures located in the delivery zone;
depositing the mineralized carbon dioxide within the subterranean formation; and
flowing the produced aqueous fluid from the subterranean formation through a portion of each of two or more production wellbores, wherein the portion of each production wellbore is a substantially horizontal portion thereof located in the delivery zone,
wherein a majority of the length of the substantially horizontal portion of each production wellbore is substantially parallel to the substantially horizontal portion of the injection wellbore, and is located in a different angular position relative to the substantially horizontal portion of the injection wellbore, and
wherein the plurality of formation fractures are each substantially perpendicular to, and periodically spaced between, the substantially horizontal portion of the injection wellbore and the substantially horizontal portion of one of the production wellbores.

2. The method of claim 1, wherein the two or more production wellbores comprise a first production wellbore and a second production wellbore, and further wherein the substantially horizontal portion of the second production wellbore is substantially parallel to the substantially horizontal portion of the injection wellbore and the substantially horizontal portion of the first production wellbore.

3. The method of claim 1, wherein the subterranean formation comprises a basaltic formation.

4. The method of claim 1, further comprising:
maintaining, for a shut-in time, the mixture within the subterranean formation during the reacting of the carbon dioxide or the ion thereof with the subterranean formation.

5. The method of claim 4, wherein the shut-in time is from about 1 hour to about 90 days.

6. The method of claim 4, wherein the introducing of the carbonated aqueous fluid occurs in a continuous fashion and wherein the shut-in time comprises a residence time.

7. The method of claim 1, wherein the carbon dioxide is at least partially dissolved within the aqueous fluid.

8. The method of claim 1, wherein the carbonated aqueous fluid has total dissolved solids of about 100 parts per million (ppm) to about 250,000 ppm.

9. The method of claim 1, wherein a quantity of the carbon dioxide introduced to the subterranean formation is in excess of a stoichiometric quantity needed to completely react with the subterranean formation to form the mineralized carbon dioxide.

10. The method of claim 1, wherein the mineralized carbon dioxide comprises a carbonate compound.

11. The method of claim 10, wherein the carbonate compound comprises calcium carbonate, magnesium carbonate, ferrous carbonate, or any combination thereof.

12. The method of claim 1, wherein the reacting occurs at a pressure of about 0.3 MPa to about 11 MPa.

13. A method comprising:
introducing a carbonated aqueous fluid comprising carbon dioxide dispersed within an aqueous fluid into a subterranean formation, through a portion of an injection wellbore, wherein the portion of the injection wellbore is a substantially horizontal portion thereof located in a delivery zone of the subterranean formation, and wherein the subterranean formation comprises a mineral of at least one of: calcium, magnesium, or iron;
reacting the carbon dioxide or an ion thereof with the subterranean formation to form mineralized carbon and a produced aqueous fluid;
flowing a mixture of the carbonated aqueous fluid and/or the produced aqueous fluid through a plurality of formation fractures located in the delivery zone, wherein the flowing occurs for a residence time;
maintaining, for the duration of the residence time, the mixture within the subterranean formation;
depositing the mineralized carbon dioxide within the subterranean formation;
flowing the produced aqueous fluid from the subterranean formation through a portion of each of two or more production wellbores, wherein the portion of each production wellbore is a substantially horizontal portion thereof located in the delivery zone,
wherein a majority of the length of the substantially horizontal portion of each production wellbore is substantially parallel to the substantially horizontal portion of the injection wellbore, and is located in a different angular position relative to the substantially horizontal portion of the injection wellbore, and
wherein the plurality of formation fractures are each substantially perpendicular to, and periodically spaced between, the substantially horizontal portion of the injection wellbore and the substantially horizontal portion of one of the production wellbores;
carbonating the produced aqueous fluid such that the produced aqueous fluid is converted to a recycled carbonated aqueous fluid; and
introducing the recycled carbonated aqueous fluid to the subterranean formation along with the carbonated aqueous fluid.

14. The method of claim 13, wherein the subterranean formation comprises a basaltic formation.

15. The method of claim 13, wherein the residence time is from about 1 hour to about 90 days.

16. The method of claim 13, wherein the carbonated aqueous fluid has total dissolved solids of about 100 parts per million (ppm) to about 250,000 ppm.

17. The method of claim 13, wherein a quantity of the carbon dioxide introduced to the subterranean formation is in excess of a stoichiometric quantity needed to completely react with the subterranean formation to form the mineralized carbon dioxide.

18. The method of claim 13, wherein the mineralized carbon dioxide comprises a carbonate compound.

19. The method of claim 18, wherein the carbonate compound comprises calcium carbonate, magnesium carbonate, ferrous carbonate, or any combination thereof.

* * * * *